(12) United States Patent
Heintzelman et al.

(10) Patent No.: US 12,367,709 B2
(45) Date of Patent: Jul. 22, 2025

(54) POLARIZED BIOMETRIC OPERATIONS

(71) Applicant: GENTEX CORPORATION, Zeeland, MI (US)

(72) Inventors: Adam R. Heintzelman, Grand Rapids, MI (US); Ryan B. Balili, Holland, MI (US); Joshua D. Lintz, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 512 days.

(21) Appl. No.: 17/748,182

(22) Filed: May 19, 2022

(65) Prior Publication Data

US 2022/0375263 A1 Nov. 24, 2022

Related U.S. Application Data

(60) Provisional application No. 63/190,328, filed on May 19, 2021.

(51) Int. Cl.
*G06V 40/19* (2022.01)
*G02F 1/01* (2006.01)
(Continued)

(52) U.S. Cl.
CPC ............ *G06V 40/19* (2022.01); *G02F 1/0136* (2013.01); *G02F 1/133528* (2013.01);
(Continued)

(58) Field of Classification Search
CPC .... G06V 40/19; G06V 40/197; G06V 10/143; G06V 40/193; G06V 10/145; G02F 1/0136; G02F 1/133528; G02F 1/13355
See application file for complete search history.

(56) References Cited

U.S. PATENT DOCUMENTS 7,819,311 B2 * 10/2010 Rowe .................... B60R 25/252
  235/382
8,092,021 B1 * 1/2012 Northcott ............. A61B 3/1015
  351/221
(Continued)

FOREIGN PATENT DOCUMENTS

EP        3151162 A1   4/2017
KR  1020090053937 A   5/2009
(Continued)

OTHER PUBLICATIONS

International Search Report dated Aug. 31, 2022, for corresponding PCT application No. PCT/US2022/029963, 4 pages.
(Continued)

*Primary Examiner* — Henok Shiferaw
*Assistant Examiner* — Toluwani Mary-Jane Ijaseun
(74) *Attorney, Agent, or Firm* — Price Heneveld LLP; Brian James Brewer

(57) ABSTRACT

A system and corresponding method are disclosed for biometric operations. The system may comprise an illumination source, a polarization selector, an imager, and a controller. The illumination source may illuminate a biometric feature. The polarization selector may receive light reflected from the biometric feature and be operable between two states selectively transmitting different polarizations. The imager may receive the light selectively transmitted by the polarization selector and generate one or more images. The controller may perform a biometric authentication based, at least in part, on the one or more images. In operation, the polarization selector may switch between states so that the system may capture two separate image sets, each based on light of a different polarization. Accordingly, adverse reflections, such as those off an eyeball or glasses, may be
(Continued)

substantially eliminated or reduced in at least one of the image sets.

13 Claims, 4 Drawing Sheets

(51) Int. Cl.
    *G02F 1/1335*     (2006.01)
    *G06V 10/143*     (2022.01)
    *G06V 10/145*     (2022.01)
    *G06V 40/18*     (2022.01)

(52) U.S. Cl.
    CPC ........ *G02F 1/13355* (2021.01); *G06V 10/143* (2022.01); *G06V 10/145* (2022.01); *G06V 40/193* (2022.01); *G06V 40/197* (2022.01)

(56) References Cited

U.S. PATENT DOCUMENTS

| | | | | |
|---|---|---|---|---|
| 10,042,324 | B2 * | 8/2018 | Sinha | .......... G03H 1/0443 |
| 2007/0280669 | A1 | 12/2007 | Karim | |
| 2009/0092296 | A1 * | 4/2009 | Yokoyama | ......... G06V 40/1318 |
| | | | | 455/556.1 |
| 2011/0064282 | A1 | 3/2011 | Abramovich et al. | |
| 2013/0141560 | A1 | 6/2013 | Friedman et al. | |
| 2016/0287144 | A1 | 10/2016 | Iwaguchi et al. | |
| 2017/0161578 | A1 | 6/2017 | Ivanisov et al. | |
| 2019/0019025 | A1 * | 1/2019 | Yamazaki | ............... G06V 40/19 |
| 2020/0210738 | A1 * | 7/2020 | Parupati | ................. G06V 40/40 |
| 2020/0311892 | A1 * | 10/2020 | Pasula | .................... G06V 40/16 |

FOREIGN PATENT DOCUMENTS

| | | | | |
|---|---|---|---|---|
| WO | 2008028045 A2 | | 3/2008 | |
| WO | WO-2011116761 A1 * | | 9/2011 | ......... G06K 9/00033 |
| WO | 2017052807 A1 | | 3/2017 | |
| WO | WO-2020244423 A1 * | | 12/2020 | ........... G02F 1/0136 |

OTHER PUBLICATIONS

Written Opinion dated Aug. 31, 2022, for corresponding PCT application No. PCT/US2022/029963, 5 pages.

* cited by examiner

POLARIZED BIOMETRIC OPERATIONS

CROSS REFERENCE TO RELATED APPLICATIONS

This application claims priority under 35 U.S.C. § 119(e) to U.S. Provisional Application No. 63/190,328 filed on May 19, 2021, entitled "Polarized Biometric Operations," the disclosure of which is hereby incorporated by reference in its entirety.

FIELD OF INVENTION

The present invention relates in general to illumination and, more particularly, to illumination for biometric operations.

BACKGROUND OF INVENTION

Image based biometric authentication systems and operations have been around for quite a while. Such systems rely on the analysis of a captured image to compare a biometric feature with a known authorized biometric profile. However, various light reflections may be captured in the image and cause the image of the biometric feature to have insufficient quality for proper analysis and comparison of the biometric feature with the biometric profile. Such light reflections may be particularly problematic when the biometric feature is an eye or a part thereof, such as an iris. Specifically, these interfering, light reflections, in addition to originating from eyeglasses or contact lenses surrounding the eye, may also originate from the eye itself. Accordingly, there is a need for improved biometric authentication systems and operations what are less affected by undesired light reflections.

SUMMARY

In accordance with the present disclosure, the problems associated with biometric authentication systems and operations have been substantially reduced or eliminated.

According to one aspect of the present disclosure, a system is disclosed. The system may comprise an illumination source, a polarization selector, an imager, and a controller. The illumination source may be operable to illuminate a biometric feature, such as an iris, with light. The polarization selector may be operable to receive light reflected from the biometric feature. Further, the polarization selector may be operable between first and second states. The first state may be operable to selectively transmit incoming light having a first polarization. The second state may be operable to selectively transmit incoming light having a second polarization. The first and second polarization may be substantially orthogonal relative one another. The imager may be operable to receive the light selectively transmitted by the polarization selector and generate one or more images. The controller may be operable to perform a biometric authentication based, at least in part, on the one or more images.

In some embodiments, the one or more images may include a first image and a second image. During generation of the first image, the polarization selector is in the first state. Similarly, during generation of the second image, the polarization selector is in the second state. Additionally, the biometric authentication may be based, at least in part, on the first and second images.

In some embodiments, the polarization selector may comprise a first substrate, a second substrate, a first electrode, a second electrode, a liquid crystal medium, and a first polarizer. The first and second substrates may be disposed in a substantially parallel, spaced apart relationship relative one another. The first electrode may be associated with the first substrate. Similarly, the second electrode may be associated with the second substrate. The liquid crystal medium may be disposed between the first and second electrodes. Further, the liquid crystal medium may be operable between an active state and a passive state. In the active state, during transmission therethrough, the liquid crystal medium substantially rotates: light from the first polarization to the second polarization and light from the second polarization to the first polarization. In the passive state the liquid crystal medium transmits light therethrough without a substantial rotation of polarization. The first polarizer may be operable to receive light transmitted by the liquid crystal medium and to selectively transmit light substantially of only one of the first and second polarizations.

In some embodiments, the polarization selector may comprise a first substrate, a second substrate, a first electrode, a second electrode, a liquid crystal medium, and a first polarizer. The first and second substrates may be disposed in a substantially parallel, spaced apart relationship relative one another. The first and second electrodes may be associated with one of the first and second substrates. The liquid crystal medium may be disposed between the first and second substrates. Further, the liquid crystal medium may be operable between an active state and a passive state. In the active state, during transmission therethrough, the liquid crystal medium substantially rotates: light from the first polarization to the second polarization and light from the second polarization to the first polarization. In the passive state the liquid crystal medium transmits light therethrough without a substantial rotation of polarization. The first polarizer may be operable to receive light transmitted by the liquid crystal medium and to selectively transmit light substantially of only one of the first and second polarizations.

In some embodiments, the illumination is of or comprises a first wavelength range. In some such embodiments, the illumination may comprise both the first and second polarizations. In other such embodiments, the illumination may be substantially limited to one of the first and second polarizations. The first wavelength range may be substantially in the infra-red or near infra-red regions of the electromagnetic spectrum. In some such embodiments, the illumination source may further comprise a first bandpass filter operable to selectively transmit the first wavelength range.

In some embodiments, the system may further comprise a second bandpass filter. The second bandpass filter may be operable to selectively transmit a second wavelength range. The second wavelength range may be within the first wavelength range. Further, the second bandpass filter operable to receive light reflected from the biometric feature and be transmitted to the polarization selector such that the light received by the polarization selector is the selectively transmitted light of the second wavelength range.

In some embodiments, the system may further comprise a second polarizer. The second polarizer may be optically disposed between the polarization selector and the biometric feature. The second polarizer may be operable to substantially transmit light comprising the first and second polarizations and substantially exclude light not of the first and second polarizations. In some such embodiments, the second polarizer comprises a segmented polarization film. The segmented polarization film may comprise a plurality of segments, each segment operable to selectively transmit one of the first and second polarizations. These segments may be arranged in a grid pattern. In other such embodiments, the second polarizer may comprise a polarizing beam splitter and a combiner. The polarizing beam splitter may be operable to split received light into first and second optical paths. In the first optical path the light may be substantially limited to one of the first and second polarizations. In the second optical path the light may be substantially limited to the other of the first and second polarizations. The combiner may be operable to combine the first and second optical paths into a single output substantially limited to the first and second polarizations.

In accordance with an operation of such a system including the polarization selector, the system may be operable to capture two separate image sets of a user and/or one or more biometric feature. Each image set being based on light of a different polarization of the first and second polarizations. An advantage of which is that various reflections, such as those off of an eyeball or glasses, which may adversely affect image quality for biometric analysis, may be substantially eliminated or reduced based on polarization in at least one of the image sets.

According to another aspect of the present disclosure, a method is disclosed. The method may comprise a series of steps. One step may be illuminating, a biometric feature of a user. The biometric feature may be one or more of the user's face, eye, retina, and iris. The illumination may be done with a light source. Additionally, the illumination may be in the infra-red or near infra-red spectra. Further, the illumination may be substantially polarized. Another step may be selectively polarizing light reflected from the user. Specifically, the light may be selectively polarized to a first polarization. Yet another step may be receiving the selectively polarized light having the first polarization. The light may be received with an imager. Yet another step may be generating a first image based on the received light having the first polarization. Further, the method may also include selectively polarizing light reflected from the user to a second polarization. The second polarization may be different than the first polarization. Another step may be receiving the selectively polarized light having the second polarization. This light may also be received with the imager. Yet another step may be generating a second image based on the received light having the first polarization. Additionally, the method may include selecting, with a controller, at least part of at least one of the first and second images based, at least in part, on image quality. The image quality may be determined based, at least in part, on the presence of undesirable reflections. Further, the method may include analyzing, with the controller, the biometric feature based on the selected at least part of the at least one of the first and second images. Furthermore, the method may include comparing one or more biometric profiles with the analysis results of the biometric feature.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

Figure 1:
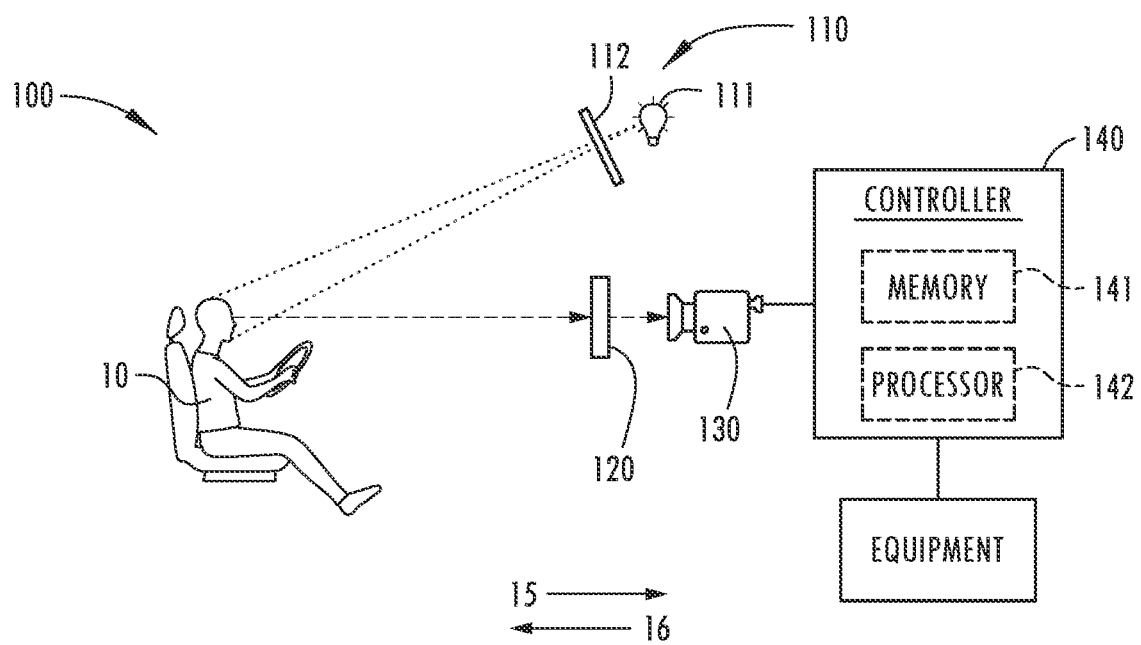
FIG. 1: a schematic representation of a biometric authentication system.

For the purposes of description herein, the specific devices and processes illustrated in the attached drawings and described in this disclosure are simply exemplary embodiments of the inventive concepts defined in the appended claims. Hence, specific characteristics relating the embodiments disclosed herein are not limiting, unless the claims expressly state otherwise.

The present disclosure is directed to a biometric authentication system and corresponding method with reduced sensitivity to undesired light reflections. FIGS. 1-4 illustrate aspects of a biometric authentication system 100. Biometric authentication system 100 may comprise an illumination source 110, a polarization selector 120, an imager 130, and/or a controller 140. Operation of biometric authentication system 100 may authenticate an identity of a user 10 based, at least in part, on one or more biometric feature of user 10. The biometric feature, for example, may be one or more of the user's 10: face, eye, retina, or iris. In some implementations, user 10 may be the driver of a vehicle.

Illumination source 110 may comprise any illumination device 111 operable to emit light. For example, illumination source 110 may be a multi-band, light emitting diode (LED), halogen, quartz, incandescent, or compact fluorescent (CFL) light bulb. In some embodiments, the light emitted by illumination device 111 may be of a first wavelength range. In other embodiments, illumination device 111 may be operable to emit light outside of the first wavelength range. In such an embodiment, illumination source 110 may further comprise a first bandpass filter 112. First bandpass filter 112 may be operable to selectively transmit the light emitted by illumination device 111 such that the light transmitted therethrough and thus provided by illumination source 110 is substantially of the first wavelength range. Accordingly, the first wavelength range may substantially encompass all of the light emitted by illumination source 110. In some embodiments, the first wavelength range may substantially comprise a wavelength range associated infra-red or near infra-red regions of the electromagnetic spectrum. Additionally, the first wavelength range may be centered around 810 nm. Further, in some embodiments, the first wavelength range may be substantially limited to the non-visible region of the electromagnetic spectrum. Furthermore, first wavelength range may be a single continuous wavelength range or a collection of discontinuous wavelength ranges. Additionally, illumination source 110 may be operable to emit the light to substantially illuminate a biometric feature of user 10. In some embodiments, the emitted light may be substantially polarized or substantially limited to a polarization via a polarizer. The polarizer may be a polarization film operable to selectively transmit light or may be an additional polarization selector disposed between illumination source 110 and user 10. This additional polarization selector may be substantially similar in function and/or construction to polarization selector 120 described below. As such, the additional polarization selector may be a second polarization selector 120. Accordingly, the light illuminating user 10 may be of a first and/or a second polarization.

Figure 2A:
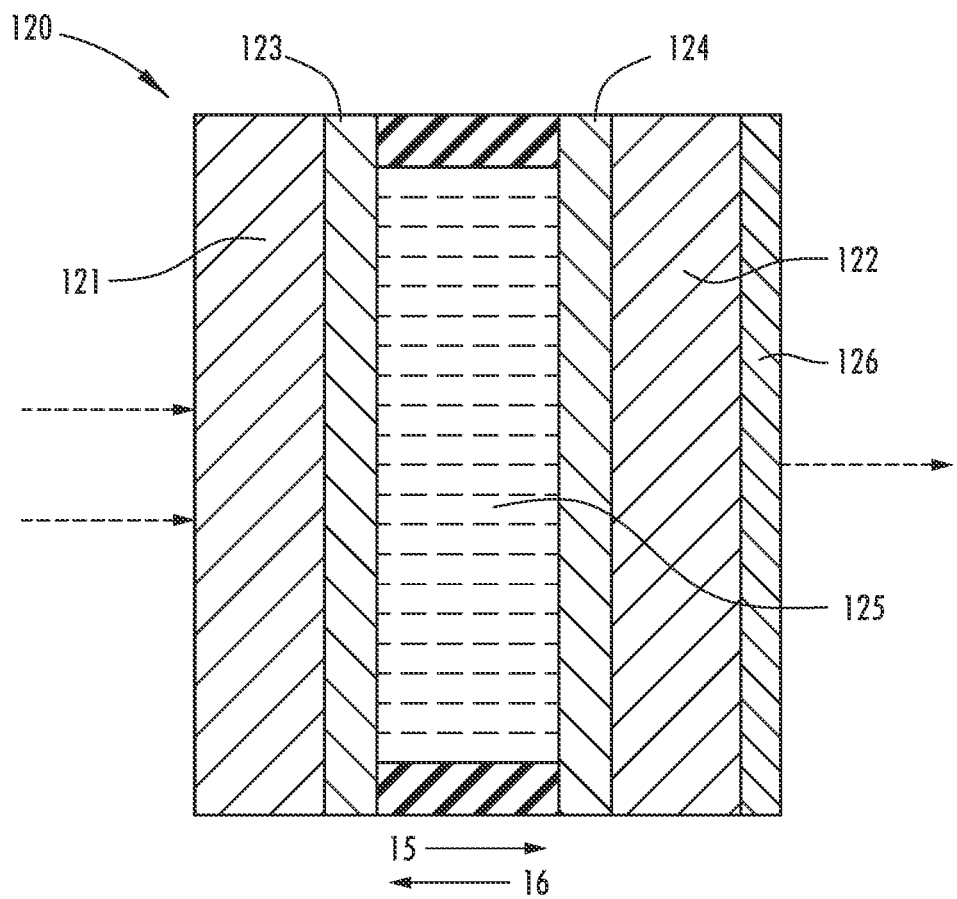
FIG. 2*a*: a cross-sectional schematic representation of a polarization selector.
Figure 2B:
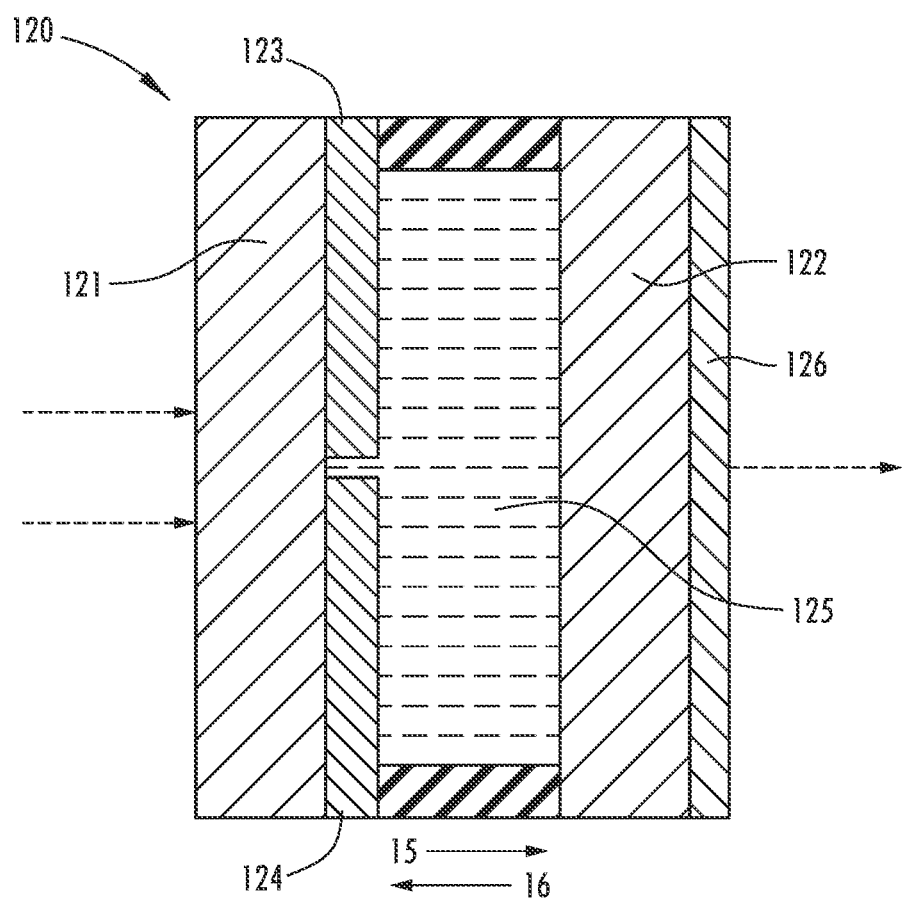
FIG. 2*b*: a cross-sectional schematic representation of a polarization selector.

Polarization selector 120 may be operable to receive light. Further, polarization selector 120 may be disposed such that the received light substantially includes light reflected off of user 10 and/or the biometric feature, where the reflected light substantially originates from illumination source 110. Further, the received light may additionally or alternatively include ambient light. Additionally, polarization selector 120 may be operable between a first state and a second state. In the first state, polarization selector 120 may be operable to substantially selectively transmit incoming light having a first polarization. Accordingly, incoming light substantially outside of the first polarization may be substantially un-transmitted or blocked, in the first state. In the second state, polarization selector 120 may be operable to substantially selectively transmit incoming light having a second polarization. Additionally, in some embodiments, polarization selector 120 may be further operable to an intermediate state between the first and second states. The second polarization may be different than the first polarization. Further, the second polarization may be substantially perpendicular to the first polarization. Accordingly, incoming light substantially outside of the second polarization may be substantially un-transmitted, in the second state. In some embodiments, as shown in FIGS. 2a-2b, polarization selector 120 may comprise a first substrate 121, a second substrate 122, a first electrode 123, a second electrode 124, a liquid crystal medium 125, and/or a polarizer 126.

First substrate 121 may be substantially transparent in the visible and/or infrared regions of the electromagnetic spectrum. Additionally, first substrate 121, for example, may be fabricated from any of a number of materials, such as alumino-silicate glass, such as Falcon commercially available from AGC; boroaluminosilicate (BAS) glass; polycarbonate, such as ProLens® polycarbonate, commercially available from Professional Plastics, which may be hard coated; polyethylene terephthalate, such as but not limited to Spallshield® CPET available from Kuraray®; soda lime glass, such as ultra-clear soda lime glass; float glass; natural and synthetic polymeric resins and plastics, such as polyethylene (e.g., low and/or high density), polyethylene terephthalate (PET), polyethylene naphthalate (PEN), polycarbonate (PC), polysulfone, acrylic polymers (e.g., poly (methyl methacrylate) (PMMA)), polymethacrylates, polyimides, polyamides (e.g., a cycloaliphatic diamine dodecanedioic acid polymer (i.e., Trog Amid® CX7323)), epoxies, cyclic olefin polymers (COP) (e.g., Zeonor 1420R), cyclic olefin copolymers (COC) (e.g., Topas 6013S-04 or Mitsui Apel), polymethylpentene, cellulose ester based plastics (e.g., cellulose triacetate), transparent fluoropolymer, polyacrylonitrile; and/or combinations thereof. While particular substrate materials are disclosed, for illustrative purposes only, numerous other substrate materials are likewise suitable.

Second substrate 122 may be disposed a substantially parallel, spaced apart relationship relative first substrate 121. Additionally, second substrate 122 may be disposed in a first direction 15 relative first substrate 121. First direction 15 may be defined as a direction substantially orthogonal to the first and second substrates 121, 122. In some embodiments, second substrate 122 may be substantially transparent in the visible and/or infrared regions. Accordingly, second substrate 122 may be comprised of the same or similar materials as those suitable for first substrate 121.

First electrode 123 is an electrically conductive material. Further, first electrode 123 may be associated with first substrate 121. The electrically conductive material of first electrode 123 may be substantially transparent in the visible and/or infrared regions of the electromagnetic spectrum and/or bond reasonably well to first substrate 121. For example, the electrically conductive material may be fabricated from a transparent conductive oxide (TCO), such as fluorine doped tin oxide (FTO), tin doped indium oxide (ITO), doped zinc oxide, indium zinc oxide, or other materials known in the art.

Second electrode 124 is, likewise, an electrically conductive material. The electrically conductive material may be fabricated from the same or similar materials as those suitable for first electrode 123. Accordingly, second electrode 124 may also be substantially transparent in the visible and/or infrared regions.

In some embodiments, such as shown in FIG. 2a, first electrode 123 may be disposed on first substrate 121, and second electrode 124 may be associated with second substrate 122. Accordingly, the first and second electrodes 123, 124 may be disposed in parallel planes. In other embodiments, such as shown in FIG. 2b, the first and second electrodes 123, 124, may both be disposed on one side of the first and second substrates 121, 122. Accordingly, the first and second electrodes 123, 124 may be disposed in the same plane.

Liquid crystal medium 125 may be a substantially transparent medium operable to switch between active and passive states. For example, liquid crystal medium 125 may be a twisted nematic (TN), vertical alignment (VA), or in-plane switching (IPS) liquid crystal medium. Twisted nematic and vertical alignment liquid crystal mediums may be particularly suitable for embodiments, such as shown in FIG. 2a, where the first and second electrodes 123, 124 are disposed on separate substrates. Conversely, in-plane switching liquid crystal mediums may be suitable for embodiments, such as shown in FIG. 2b, where the first and second electrodes 123, 124, are disposed on the same substrate. Further, liquid crystal medium 125 is disposed between first substrate 121 and second substrate 122. As such, in some embodiments, liquid crystal medium 125 may be disposed between the first and second electrodes 123, 124.

The active state of liquid crystal medium 125 may correspond to one of the first state or second state of polarization selector 120, with the passive state corresponding the remaining of the first state and the second state. In the active state, liquid crystal medium 125 may substantially rotate a polarization of light transmitting therethrough. In some embodiments, this rotation may be approximately 90 degrees. For example, incoming light having the first polarization will have the second polarization after transmission, and incoming light having the second polarization will have the first polarization after transmission. In a passive state, the liquid crystal medium 125 may not substantially rotate the polarization of light transmitting therethrough. Accordingly, incoming light having the first polarization will still have the first polarization after transmission, and incoming light having the second polarization will still have the second polarization after transmission. Operation between the active and the passive states may correspond to the application of an electrical field through liquid crystal medium 125. In some embodiments, the active state may correspond to a substantial absence of an electric field applied through the liquid crystal medium 125, and the passive state may correspond to a substantial application of an electric field though liquid crystal medium 125. In other embodiments, the active state may correspond to a substantial application of an electric field through the liquid crystal medium 125, and the passive state may correspond to the substantial absence of an electric field applied through liquid crystal medium 125. Additionally, in some embodiments, liquid crystal medium 125 may be operable to enter the first and second states to varying degrees based on properties of the electric field. In other words, liquid crystal medium 125 may enter an intermediary state between the first and second states where the polarization of the incoming light is partially rotated such that it has a polarization between the first and second polarizations. As such, the rotation may be less than 90 degrees.

Polarizer 126 may be disposed in the first direction 15 relative the liquid crystal medium 125. Accordingly, polarizer 126 may be associated with second substrate 122. Thus, polarizer 126 may receive light transmitted by the liquid crystal medium. Further, polarizer 126 may be operable to selectively transmit light therethrough based on polarization. For example, polarizer may be operable to substantially transmit light having one of the first and second polarizations and substantially not transmit or block the other of the first and second polarizations. Thus, in some embodiments, polarizer 126 may be an absorptive polarizer.

Imager 130 may be operable to substantially receive light selectively transmitted through polarizer 126. Thus, imager 130 may be disposed in the first direction 15 relative liquid crystal medium 125. Further, imager 130 may be any device operable to capture light and generate one or more digital images. In some embodiments, the captured light may, at least in part, be in the infra-red and/or near infra-red regions of the electromagnetic spectrum. Additionally, the one or more digital images may include a first image and a second image. For example, imager 130 may be a camera such as a Semi-Conductor Charge-Coupled Device (CCD) or a pixel sensor of Complementary Metal-Oxide-Semi-Conductor (CMOS) technologies.

Controller 140 may be communicatively connected to imager 130. Accordingly, controller 140 may be configured to and/or operable to receive the one or more images from imager 130. Further, controller 140 may be configured to and/or operable to perform a biometric authentication based, at least in part, on the one or more images. The biometric authentication may comprise analyzing one or more biometric feature of user 10 contained in the one or more images and comparing the one or more biometric feature with an authorized biometric profile. Additionally, controller may comprise a memory 141 and a processor 142.

Memory 141 may be a non-transitory computer readable computer usable or readable medium, which may include one or more storage devices or articles. Accordingly, memory 141 may be operable to store one or more instructions. Examples of memory 141 include conventional hard disks, solid-state memories, random access memories (RAM), read-only memory (ROM), erasable programmable read-only memory (EPROM), electronically erasable programmable read-only memory (EEPROM), optical or magnetic disks, dynamic random-access memory (DRAM).

Further, memory 141 may be operable to store one or more biometric profiles. The one or more biometric profiles may comprise one or more authorized biometric profile. Additionally, memory 141 may be operable to store one or more algorithm. In some embodiments, an algorithm may be operable to analyze one or more images received from imager 130. The one or more images may be analyzed to detect and characterize or quantify a biometric feature imaged therein. Further, the algorithm may compare the biometric feature with one or more of the biometric profiles. Accordingly, the algorithm may be operable to match the biometric feature with a biometric profile. The biometric profile may further provide whether the biometric profile is an authorized profile or not. If the biometric profile is an authorized profile, user 10 may be determined as an authorized user. Thus, the algorithm may be operable to determine if user 10 is an authorized user based, at least in part, on the one or more images.

In some embodiments, memory 141 may be operable to store one or more user profile. The user profile may be associated with a biometric profile for a common user. Further, the user profile may comprise one or more preference or restriction for one or more pieces of equipment. The equipment may be, for example, a vehicle, a vehicle computer, a mirror, a window, a radio, a dashboard, a steering wheel, a foot pedal system, a lighting system, a payment system, and/or a toll system. The preference or restriction may be, for example, a seat position, window tint level, radio station, radio volume, maximum vehicle speed, driving mode, dashboard illumination, mirror position, rearview display vs mirror preference, steering wheel position, pedal position, lighting level or color, and/or payment method. In such an embodiment, the algorithm may be operable to implement one or more of the preferences or restrictions onto one or more of the pieces of equipment.

Processor 142 may be communicatively connected to memory 141. Further, processor 142 may be any device or electronic circuit capable of processing or executing one or more sets of electronic instructions, such as the algorithm. These instructions may be stored in memory 141. Examples of processor 142 may include a central processing unit (CPU), a microprocessor, and/or an application specific integrated circuit (ASIC).

Figure 3:
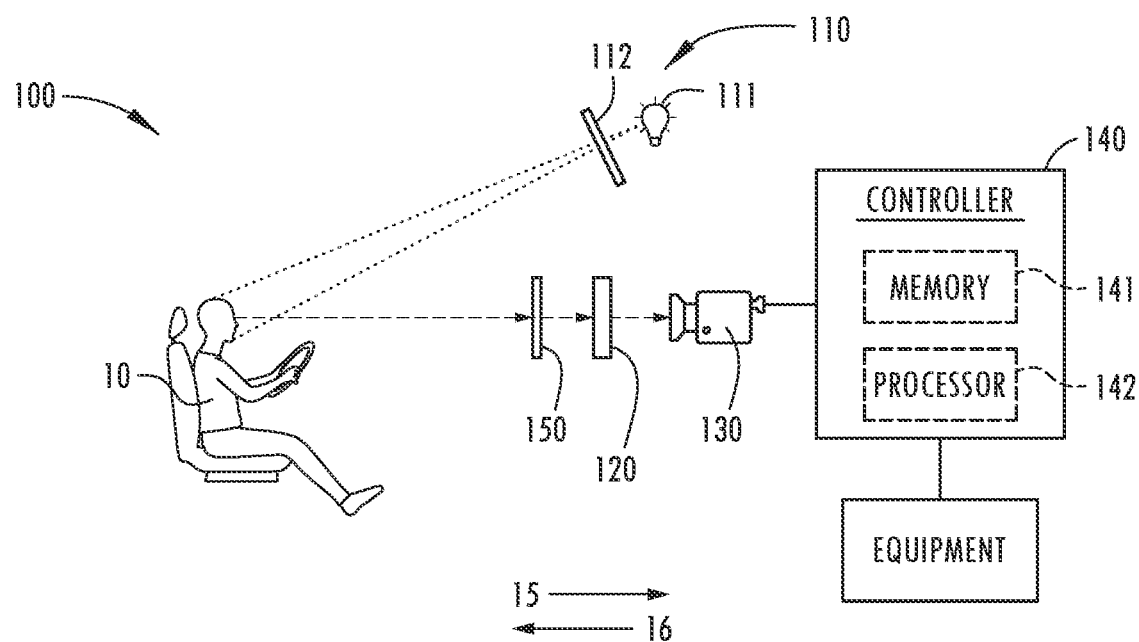
FIG. 3: a schematic representation of a biometric authentication system.

Additionally, as shown in FIG. 3, in some embodiments, biometric authentication system 100 may further comprise a second bandpass filter 150. Second bandpass filter 150 may be configured to and/or operable to selectively transmit light of a second wavelength range. The second wavelength range may be comprised in the first wavelength range. In some embodiments, the first and second wavelength ranges may be substantially equivalent. Accordingly, the second wavelength range may substantially comprise a wavelength range associated infra-red or near infra-red regions of the electromagnetic spectrum. Additionally, the second wavelength range may be centered around 810 nm. Further, in some embodiments, the second wavelength range may be substantially limited to the non-visible region of the electromagnetic spectrum. The light received by second bandpass filter 150 may substantially include light originating from illumination source 110 that is reflected off of user 10 and/or the biometric feature. Further, the light transmitted by bandpass filter 150 may be substantially received by polarization selector 120. Thus, in some embodiments, second bandpass filter 150 may be optically disposed between polarization selector 120 and/or liquid crystal medium 125 and user 10. As such, second bandpass filter 150 may be disposed in a second direction 16 relative polarization selector 120 and/or liquid crystal medium 125. Second direction 16 may be defined as substantially opposite in direction relative the first direction 15.

Figure 4:
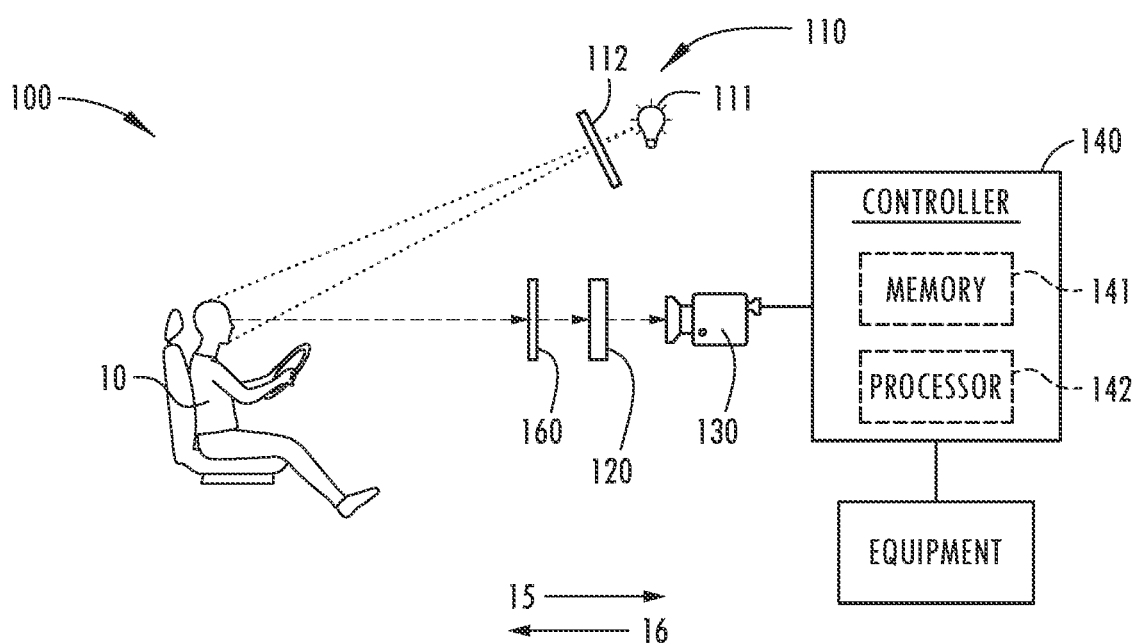
FIG. 4: a schematic representation of a biometric authentication system.

Additionally or alternatively, as shown in FIG. 4, in some embodiments, biometric authentication system 100 may further comprise a second polarizer 160. Second polarizer 160 may be optically disposed between liquid crystal medium 125 and user 10. Additionally, second polarizer 160 may be further optically disposed between second bandpass filter 150 and liquid crystal medium 125 or between second bandpass filter 150 and user 10. Further, second polarizer 160 may be configured to and/or operable to substantially limit light transmitted therethrough to the first and second polarizations. Accordingly, second polarizer 160 may receive light reflected off user 10 and/or the biometric feature. This light may or may not have been transmitted through second bandpass filter 150, depending on construction. This light received by second polarizer 160 may comprise light of any number of orientations. Accordingly, the light may comprise light of any number of polarizations. However, the second polarizer may selectively transit light having the first polarization or the second polarization and substantially not transmit light between these two polarizations. Thus, the light transmitted through second polarizer 160 may discreetly be of the first and second polarizations. Further, the light transmitted by second polarizer 160 may be substantially received by polarization selector 120 and/or second bandpass filter 150.

In some embodiments, second polarizer 160 may be a segmented polarizer, such as a divided or checkered polarizer. In such an embodiment, second polarizer 160 may comprise a polarization film divided into a plurality of segments, each segment operable to substantially selectively transmit one of the first and second polarizations. In other embodiments, the second polarizer 160 may comprise a polarizing beam splitter and combiner. In such an embodiment, second polarizer 160 may be operable to split received light into two different optical paths, via an arrangement of polarizers, lenses, and/or reflectors. In one optical path, the light may be substantially limited to one of the first and second polarizations. In the other optical path, the light may be substantially limited to the other of the first and second polarizations. Further, these optical paths may be subsequently combined to have a single output of light selectively and discreetly comprising the first and second polarizations.

In operation, light from illumination source 110 may illuminate user 10 and/or one or more biometric feature. This light may reflect from the user 10 and/or one or more biometric feature. In embodiments where biometric authentication system 100 comprises second bandpass filter 150, second bandpass filter 150 may receive the reflected light. Further, second bandpass filter 150 may selectively transmit the received light in order to filter out light that is outside of a desired imaging wavelength or wavelength range, improving image quality. Additionally or alternatively, second polarizer 160 may receive the reflected light and substantially selectively transmit light having the first or second polarizations and substantially not transmit or block light not of the first or second polarizations. This transmitted light—or in embodiments not comprising second bandpass filter 150 or the second polarizer 160, the reflected light—may be received by polarization selector 120. In embodiments, without second polarizer 160, the light received by polarization selector 120 may be said to be "un-polarized," meaning that it comprises light having both the first and second polarizations as well as light having orientations (i.e. polarizations) between the first and second polarizations. In embodiments with second polarizer 160, the light received by polarization selector 120 may be include the first and second polarizations but be substantially limited thereto. Accordingly, in either case, the incoming light may have a first component and a second component. The first component may be light of the first polarization. Conversely, the second component may be light of the second polarization.

When polarization selector 120 is in the first state, the components of incoming light having a first polarization may be substantially selectively transmitted. Conversely, when polarization selector 120 is in the second state, the components of incoming light having a second polarization may be substantially selectively transmitted. An example of such a selective transmission follows.

In one state, liquid crystal medium 125 may be in a passive state, either by the application or absence of an electrical potential applied across the first and second electrodes 123, 124. Thus, the first component of the light, which has an incoming first polarization, may be substantially transmitted and remain substantially polarized in the first orientation. Likewise, the second component of the light, which has a second polarization, may be substantially transmitted and remain polarized in the second orientation. The transmitted light may then encounter polarizer 126. Polarizer 126 may be operable to selectively transmit light having one of the first and second polarizations and substantially not transmit the other of the first and second polarizations. Accordingly, polarizer 126 may selectively transmit one of the first and second components based on polarization.

In the other state, liquid crystal medium 125 may be in an active state, by the other of the application or absence of an electrical potential applied across the first and second electrodes 123, 124. Thus, the first component of the light, which has an incoming first polarization, may be substantially transmitted and substantially converted into the second polarization. Likewise, the second component of the light, which has an incoming second polarization, may be substantially transmitted and substantially converted into the second polarization. The transmitted light may then encounter polarizer 126. Polarizer 126 may be operable to selectively transmit light having one of the first and second polarizations and substantially not transmit the other the first and second polarizations, where the selective transmission is of the same of the first and second polarizations as in the other state. Accordingly, since the polarizations of the first and second components have been effectively swapped, polarizer 126 may selectively transmit the one of the first and second components not transmitted in the other state, based on polarization.

Subsequently, the component of light selectively transmitted by polarization selector 120 may be received by imager 130. Imager 130 may, accordingly, generate one or more images based on the received light. The one or more images may correspond to one or more first images and one or more second images. Generation of the first images may correspond to when polarization selector 120 is in the first state. Accordingly, the first image may be generated exclusively based on one of the first and second components of light. Further, the second images may correspond to when polarization selector 120 is in the second state. Accordingly, the second image may be generated exclusively based on the remaining of the first and second components of light. Additionally, the polarization selector 120 may switch between the first and second states such that the first and second images may correspond to very proximate points in time. Accordingly, imager 130 may be operable to capture the plurality of images substantially synchronously with operation of polarization selector 120.

In accordance with such an operation of polarization selector 120, biometric authentication system 100 may be operable to capture two separate image sets of user 10 and/or one or more biometric feature, each image set being based on light of a different polarization of the first and second polarizations, or an intermediate polarization between the first and second polarizations. An advantage of which is that various reflections, such as those off of an eyeball or glasses, which may adversely affect image quality for biometric analysis, may be substantially eliminated or reduced based on polarization in at least one of the image sets.

Further, one or more of the images may be analyzed by the algorithm. The algorithm may accordingly analyze one or more biometric feature contained therein to match the biometric feature with a biometric profile. In the event one image is adversely affected by undesirable reflections, the algorithm may rely on a different image correspond to a different polarization component of the light, in order to reduce or eliminate their affects. Additionally, the biometric profile may be used to determine if user 10 is an authorized user and/or implement one or more equipment preference or restriction based, at least in part, on a user profile associated with the biometric profile.

Figure 5:
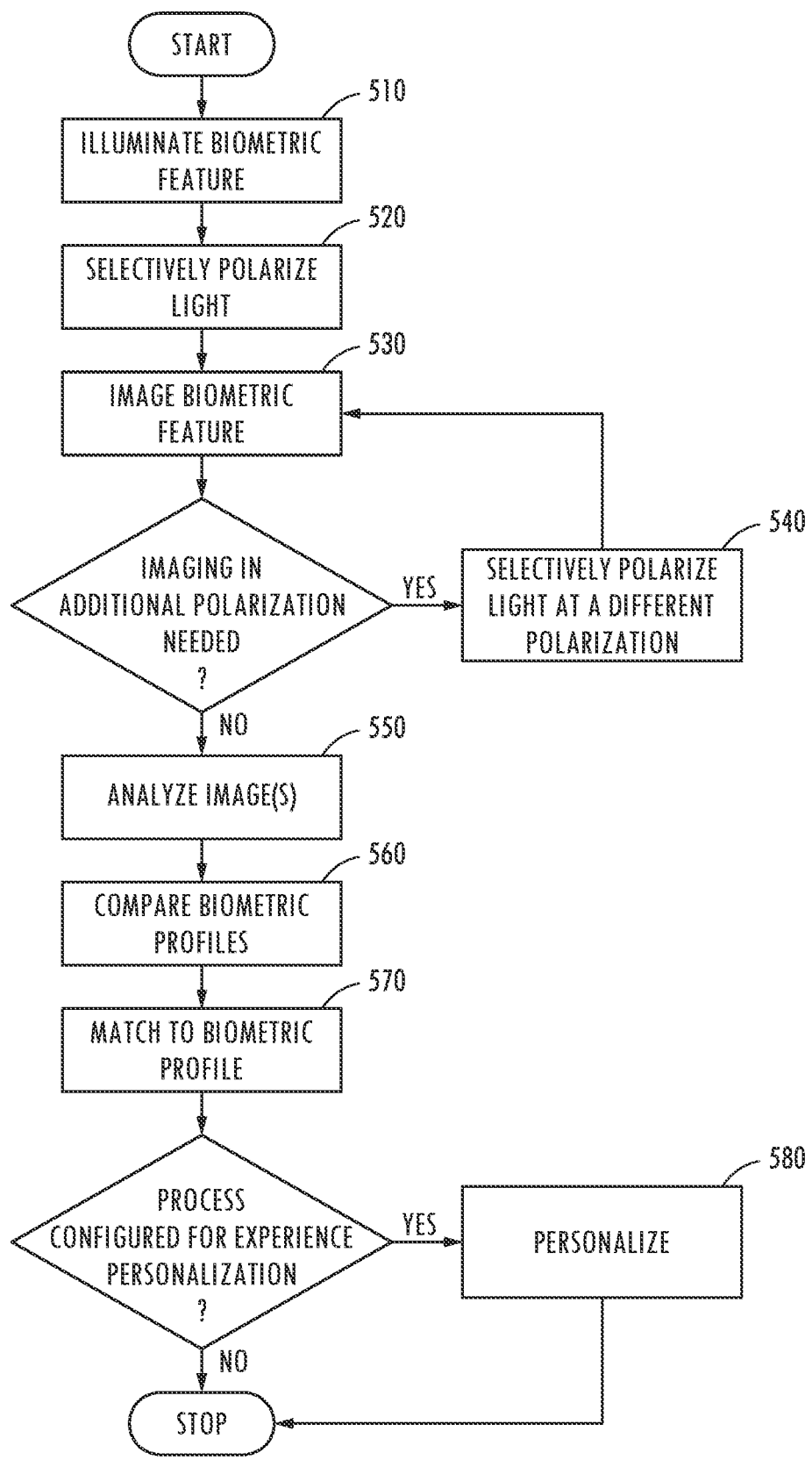
FIG. 5: a process flow diagram for the operation of a biometric authentication system.

FIG. 5 is a process flow diagram for operating a biometric authentication system, such as one of FIGS. 1-4. The process may comprise one or more of the steps of: illuminating a biometric feature 510, selectively polarizing light 520, imaging the biometric feature 530, analyzing one or more images 550, comparing analysis to biometric profiles 560, and/or matching to a biometric profile 570.

The process for operating the biometric authentication system may start with the step of illuminating a biometric feature 510. In this step, an illumination source may be activated to illuminate one or more biometric feature of a user. The illumination source may be the same as or similar to illumination source 110. The biometric feature, for example, may be one or more of the user's face, eye, retina, or iris. Further, the illumination may be substantially limited to a non-visible region of the electromagnetic spectrum. In some embodiments, the illumination may primary comprise infra-red or near infra-red light. Additionally, the illumination may comprise light having one or both of first and second polarizations. Light of the second polarization may have an orientation substantially orthogonal to the light of the first polarization. Accordingly, the incoming light may have a first component and a second component. The first component may be the light having the first polarization. Conversely, the second component may be the light having the second polarization.

The process may proceed to the step of selectively polarizing light 520 reflected from a user and/or a biometric feature. In this step, the light may be polarized to one of the first and second polarizations. Accordingly, light of only one of the first and second polarizations may be transmitted. This polarization may be accomplished by a polarization selector. The polarization selector may be the same as or similar to polarization selector 120. The light that is polarized may include a reflection, from the biometric feature, of the illuminating light.

After selective polarization 520, the process may proceed to the step of imaging the biometric feature 530. In this step, the transmitted polarized light may be received by an imager. The imager may be the same as or similar to imager 130. Accordingly, the imager may generate one or more images based on the received light. The one or more images may include a first image.

In some embodiments, the process may be configured to capture an additional image in a different polarization. In such an embodiment, the process may proceed to the step 540 of selectively polarizing light reflected from the biometric feature at a different polarization. In this step 540, the light may be polarized to the other of the first and second polarizations. Accordingly, light of only the remaining of the one of the first and second polarizations may be transmitted. This polarization may, likewise, be accomplished by the same polarization selector as in the selective polarization step 520. Subsequently, the process may return to the imaging the biometric feature step 530, where the transmitted polarized light may be received by the imager. Accordingly, the imager may generate one or more images based on this received light having a different polarization. The one or more images may include a second image. Thus, the first image and the second image may be of the biometric feature at different polarizations of light.

Next, the process may proceed to the step of analyzing the image or images 550. In this step, the image or images may be analyzed to detect and characterize or quantify the biometric feature. The image or images may be analyzed by a controller. The controller may be the same as or similar to controller 140. Further, the analysis may include an analysis of all or part of the first image and/or second image. Which of the first and/or second images and/or the part of the first and/or second images that is used for the analysis may be based, at least in part, on a quality of the image or relevant part thereof. The image quality may be determined based, at least in part, on undesirable reflections.

Based on the image analysis 550, in the next step, the analysis results of the biometric feature may be compared with one or more biometric profiles 560. Further, in a proceeding step, based on the comparisons, the results may be matched with one of the biometric profiles 570. In this step, the match may be determined based, at least in part, on the characterizations of the imaged biometric feature having commonalities above a threshold with biometric feature characterizations associated with one of the compared biometric profiles.

Additionally, in some embodiments, one or more pieces of equipment may be personalized 580. The equipment may be personalized based, at least in part, on one or more preference or restriction for one or more pieces of equipment being associated with the biometric profile. The equipment may be, for example, a vehicle, a vehicle computer, a mirror, a window, a radio, a dashboard, a steering wheel, a foot pedal system, a lighting system, a payment system, and/or a toll system. The preference or restriction may be, for example, a seat position, window tint level, radio station, radio volume, maximum vehicle speed, driving mode, dashboard illumination, mirror position, rearview display vs mirror preference, steering wheel position, pedal position, lighting level or color, and/or payment method.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

In this document, relational terms, such as "first," "second," and the like, are used solely to distinguish one entity or action from another entity or action, without necessarily requiring or implying any actual such relationship or order between such entities or actions.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A system comprising: an illumination source comprising (i) an illumination device operable to emit light and (ii) a bandpass filter operable to selectively transmit the light that the illumination device emits at a first wavelength range, the illumination source positioned so that the light of the first wavelength range that the bandpass filter transmits is directed to a biometric feature, the biometric feature reflecting at least a portion of the light of the first wavelength range after the light transmits through the bandpass filter;
   a polarization selector operable to receive light reflected from the biometric feature, the polarization selector operable between:
      a first state operable to selectively transmit incoming light having a first polarization, and
      a second state operable to selectively transmit incoming light having a second polarization;
   an imager operable to receive the light selectively transmitted by the polarization selector and generate one or more images;
   a controller operable to perform a biometric authentication based, at least in part, on the one or more images; and
   a polarizer optically disposed between the polarization selector and the biometric feature, the polarizer operable to substantially transmit light comprising the first polarization and the second polarization and substantially excludes light not of the first polarization and the second polarization,
   wherein, the first wavelength range of the light exiting the bandpass filter is associated with infrared or near infrared regions of an electromagnetic spectrum.

2. The system of claim 1, wherein:
   the imager is operable to generate a first image and a second image;
   during generation of the first image, the polarization selector is in the first state; and
   during generation of the second image, the polarization selector is in the second state.

3. The system of claim 2, wherein the biometric authentication is based, at least in part, on the first and second images.

4. The system of claim 1, wherein the polarization selector comprises:
   a first substrate;
   a second substrate disposed in a spaced apart relationship relative the first substrate;
   a first electrode associated with the first substrate;
   a second electrode associated with the second substrate;
   a liquid crystal medium disposed between the first and second electrodes, the liquid crystal medium operable between an active state and a passive state, wherein:
      in the active state, during transmission therethrough, the liquid crystal medium substantially rotates:
         light from the first polarization to the second polarization, and
         light from the second polarization to the first polarization, and
      in the passive state, the liquid crystal medium transmits light therethrough without a substantial rotation of polarization; and
   a second polarizer operable to:
      receive light transmitted by the liquid crystal medium, and selectively transmit light substantially of only one of the first polarization and the second polarization.

5. The system of claim 1, wherein the polarization selector comprises:
   a first substrate;
   a second substrate disposed in a spaced apart relationship relative the first substrate;
   a first electrode and a second electrode, both associated with one of the first and second substrates;
   a liquid crystal medium disposed between the first and second substrates, the liquid crystal medium operable between an active state and a passive state, wherein:
      in the active state, during transmission therethrough, the liquid crystal medium substantially rotates:
         light from the first polarization to the second polarization, and
         light from the second polarization to the first polarization, and
      in the passive state, the liquid crystal medium transmits light therethrough without a substantial rotation of polarization; and
   a second polarizer operable to:
      receive light transmitted by the liquid crystal medium, and
      selectively transmit light substantially of only one of the first polarization and the second polarization.

6. The system of claim 1, wherein the light of the illumination device is of a first wavelength range and the first wavelength range is substantially in the infrared or near infrared region of the electromagnetic spectrum.

7. The system of claim 1, further comprising:
   a second bandpass filter positioned and operable to selectively transmit a second wavelength range of the light reflected from the biometric feature before reaching the polarization selector, the second wavelength range within the first wavelength range;
   wherein the light received by the polarization selector is the selectively transmitted light of the second wavelength range from the second bandpass filter.

8. The system of claim 1, wherein light from the illumination device comprises both the first polarization and the second polarization.

9. The system of claim 1, wherein the illumination from the illumination source is substantially limited to one of the first polarization and the second polarization.

10. The system of claim 1, wherein the biometric feature is an iris.

11. The system of claim 1, wherein the light of the first polarization is substantially orthogonal in orientation relative the light of the second polarization.

12. The system of claim 1, wherein the polarizer comprises a segmented polarization film comprising a plurality of segments, each segment operable to selectively transmit one of the first polarization and the second polarization.

13. The system of claim 1, wherein the polarizer comprises:
- a polarizing beam splitter operable to split received light into first and second optical paths, in the first optical path the light may be substantially limited to one of the first polarization and the second polarization and in the second optical path the light may be substantially limited to the other of the first polarization and the second polarization; and
- a combiner operable to combine the first and second optical paths into a single output substantially limited to the first polarization and the second polarization.

\* \* \* \* \*